United States Patent Office 3,126,292
Patented Mar. 24, 1964

3,126,292
HYDROCARBON BINDER COMPOSITIONS
Jacques Bottero, Marseille, and Charles Gaestel, Notre-Dame-de-Gravenchon, France, assignors to Esso Research and Engineering Company, a corporation of Delaware
No Drawing. Filed June 16, 1961, Ser. No. 117,517
Claims priority, application France June 25, 1960
5 Claims. (Cl. 106—277)

The present invention relates to the improvement of the coating properties of hydrocarbon binders, and relates also to acidic, basic or neutral emulsions of hydrocarbon binders.

It is known that hydrocarbon binders, such as bitumens, tars, and road oils, adhere satisfactorily to dry materials such as mineral aggregates, but adhere with difficulty to wet materials, particularly if these materials are acidic in character, such as silica or quartzite aggregates. When using such binders for road-making, it is necessary to work in fine weather, in consequence of the difficulties caused by rain. Moreover, during the life of the coated aggregates, the action of water is one of the principal causes of the break-down of bituminous or tar coatings on the aggregates.

While liquid bitumen or tar may be used as a coating agent, bitumens and other hydrocarbon binders have been used for many years in the form of aqueous emulsions in numerous industries, including the construction and maintenance of roads, the water-proofing of cardboards and felts, and for surface coatings for protection from the weather, and from corrosion.

Numerous techniques have been used for making such emulsions. They generally consist in vigorously stirring, by means of a mechanical device such as a colloid mill or a centrifugal pump, a bituminous phase and an aqueous phase, in the presence of an emulsifying agent. The emulsifying agent may be dissolved in either of the two phases. When it is in the bituminous phase, and an acidic or basic emulsion is required, it is sufficient to add the acid or the base to the aqueous phase.

When the emulsifying agent is in the aqueous phase, it is treated with either the acid or the base so as to form the anionic or cationic soap before emulsification. In the case of a non-ionic emulsifying agent, this may be added as such to either phase.

The alkaline emulsions break slowly, the breaking being provoked by the evaporation of the water. The adhesivity of such emulsion to materials is low in the presence of water. In contrast, the acid emulsions allow hydrocarbon binders to be made to adhere to wet or damp acidic materials, their breaking tendency depending according to the formula of the cationic soap used. Their speed of breaking depends on a physico-chemical process totally different from that of the alkaline emulsions.

It has previously been proposed that the adhesivity of bitumen or tar coatings, including petroleum bitumen or tars, may be improved by incorporating in the bitumen or tar composition, including the liquid tar or bitumen, or emulsions thereof, small proportions of soaps of heavy metals, phenoxides, alkyl phosphates or organic bases, such as amines or pyridines.

It has now been discovered that bitumen or tar compositions, including emulsions thereof, have improved adhesive properties to materials on which they are coated, if there is incorporated into such compositions small proportions of an amino acid or a salt thereof.

Amino-acids which may be used according to the invention include those corresponding to the following formulae:

$$R.(NH.R')_n—A$$
$$R.CH.NH_2.R'—A$$

in which:

The "A" is carboxylic (—COOH), sulphuric
$$(—O—SO_2H)$$
sulphonic (—SO_3H—) or phosphoric
$$(—O—PO_3HR'')$$
groups;

$n$ is an integer, preferably between 1 and 5;
R is a straight or branched hydrocarbon group, preferably an alkyl radical having from 1 to 25 carbon atoms, particularly $C_{16}$—$C_{18}$ carbon atoms;
R' is a straight or branched hydrocarbon chain preferably having from 1 to 25 carbon atoms, which may be different from one NH—R' group to another; and
R'' is hydrogen or a hydrocarbon chain preferably having from 1 to 25 carbon atoms.

According to the invention, the salts of amino-acids may be used, including:

(1) A salt obtained by reaction of the amino-acid with a strong base such as, for example, NaOH or KOH;
(2) A salt obtained by reaction of the amino-acid with a mineral acid or a carboxylic acid preferably having a low molecular weight, e.g. a $C_1$—$C_3$ carboxylic acid.
(3) A salt obtained by neutralisation of a mineral acid salt of the amino-acid, with a strong base.

A mixture of such amino-acids and/or their salts may also be used.

For the preparation of the hydrocarbon binder emulsions, a salt of group 2 above will be used in acid phase, a salt of group 1 in basic phase and a salt of group 3 in neutral phase.

According to the invention, the amount of amino-acid or amino-acid salt to be added to the hydrocarbon binders or to the binders to be made into emulsions is preferably between 0.1 and 10%, preferably between 0.2 and 2% by weight, based on the hydrocarbon binder.

The use of amino acids or salts thereof according to this invention is applicable in particular to binders used in the road-making industry, such as bitumens, road oils and tars including cut-back bitumens, and bitumens fluxed with solvents, or emulsions thereof. It can also be applied to anti-corrosive paints based on bitumens or tars, and solvents, particularly those suitable for coating metal sheets before their subsequent treatment with sealing coatings, or for coating pipes which are to be buried. For basic emulsions, strong bases such as caustic soda or caustic potash at concentrations ranging preferably from 0.2 to 10 parts per thousand, e.g. 0.15 to 1.5% by weight with respect to the weight of the bitumen are generally used. For acidic emulsions, the acids used are preferably mineral acids (for example, hydrochloric acid) or low molecular weight organic acids (for example, acetic acid) at concentrations ranging preferably from 1.5 to 15 parts per thousand, e.g. 0.15 to 1.5% by weight with respect to the weight of the bitumen.

For emulsions in neutral phase, these acids or bases are used in concentrations such that the neutralisation of the amino-acid is effected.

According to the invention, the amino-acid or its salt may be added either to the aqueous phase with the acid or the base (formation of cationic or anionic soap before the emulsion) or to the hydrocarbon binder. In the latter case, the acid or base is added to the aqueous phase in the desired concentration.

The amino-acids may be prepared for instance from an aliphatic amine by the following reactions:

An amino-nitrile prepared by the reaction of the amine with acrylonitrile is hydrolysed with a mineral acid, for example, hydrochloric acid. The hydrolysis is terminated by distillation in superheated steam for several hours, and the hydrochloride salt of the amino-acid is extracted for instance with methyl ethyl ketone, and the amino-acid obtained by neutralization with a base such as alcoholic caustic potash. The steam distillation and the methyl ethyl ketone extraction may be replaced by solution in methyl ethyl ketone followed by precipitation with $CCl_4$, filtration and drying to obtain the final amino acid.

The invention is illustrated by the following axamples.

In a first series of examples the amino-acids or amino-acid salts used were the following:

TYPE I $R—NH_2Cl—(CH_2)_2—COOH$ (hydrochloric acid salt)

and

TYPE II $R—NH—(CH_2)_3—NH(CH_2)_2—COOH$ in which R is a $C_{14}$-$C_{18}$ alkyl group.

These compounds were prepared from the corresponding aliphatic amine in the following general manner.

A mixture of one mole of an aliphatic amine $R—NH_2$ wherein R is a $C_{16}$-$C_{18}$ alkyl group, and one mole of acrylonitrile $CH_2=CH—C\equiv N$ was stirred for 30 minutes at 80° C. to form an aminonitrile $$R—NH—CH_2—CH_2—C\equiv N$$

which was hydrolysed with 14 N hydrochloric acid (in the proportions of 1 to 5 by weight) for 2 hours at a temperature of 80° C. Then, by distillation in superheated steam (130° C.) for three hours, a large part of the acidity of the product was eliminated and the hydrolysis was completed and, finally, the hydrochloride of the amino-acid $R—NH_2Cl—(CH_2)_2—COOH$, which formed a white solid product, was extracted wth methyl ethyl ketone.

This hydrochloride, dissolved in alcohol, was treated with alcoholic caustic potash to obtain the amino-acid with a precipitate of KCl.

Example I

Tests were carried out with a petroleum bitumen cutback with mineral oil in order to compare the adhesivity-improving properties of the amino-acids on siliceous materials (2/1 mm. silica) with those of the initial amines.

The cut-back bitumen used had the following characteristics:

Density at 15° C. _____ 0.98
Viscosity _____centistokes__ 22
ASTM penetration at 25° C. after evaporation of the mineral oil _____ 200±20

These tests were carried out by mixing, for 5 minutes, 100 g. of silica with 10 g. of cut-back bitumen containing the various adhesivity-improving products to be compared. The coated material was then immersed and the percentage of material remaining coated after 24 hours' immersion was determined.

These tests gave the following results:

| Amino acid compound used, percent by weight with respect to the bitumens | 0 | 0.1 | 0.25 | 0.5 |
|---|---|---|---|---|
| Formula | Percent of material covered after 24 hours' immersion | | | |
| $C_{14}H_{29}NH_2$ | 20 | 50 | 60 | 60 |
| $C_{14}H_{29}NH_2Cl(CH_2)_2COOH$ | 20 | 50 | 80 | 95 |
| $C_{16}H_{33}NH_2$ | 20 | 30 | 60 | 60 |
| $C_{16}H_{33}NH_2Cl(CH_2)_2COOH$ | 20 | 30 | 80 | 80 |
| $C_{18}H_{37}NH_2$ | 20 | 60 | 90 | 95 |
| $C_{18}H_{37}NH_2Cl(CH_2)_2COOH$ | 20 | 60 | 95 | 95 |
| $C_{18}H_{37}NH(CH_2)_3NH_2$ | 20 | 60 | 90 | 95 |
| $C_{18}H_{37}NH(CH_2)_3—NH(CH_2)_2—COOH$ | 20 | 80 | 95 | 95 |

Example II

Tests were carried out under the same conditions as in Example I to determine the adhesivity-enhancing properties of the same products of 3/8 mm. calcite aggregates. These tests gave the following results:

| Amino acid compound used, percent by weight with respect to the bitumens | 0 | 0.1 | 0.25 | 0.5 |
|---|---|---|---|---|
| Formula | Percent of material covered after 24 hours' immersion | | | |
| $C_{14}H_{29}NH_2$ | 20 | 40 | 60 | 70 |
| $C_{14}H_{29}NH_2Cl(CH_2)_2COOH$ | 20 | 40 | 90 | 95 |
| $C_{16}H_{33}NH_2$ | 20 | 40 | 60 | 60 |
| $C_{16}H_{33}NH_2Cl(CH_2)_2COOH$ | 20 | 40 | 90 | 95 |
| $C_{18}H_{37}NH_2$ | 20 | 40 | 60 | 60 |
| $C_{18}H_{37}NH_2Cl(CH_2)_2COOH$ | 20 | 40 | 60 | 80 |
| $C_{18}H_{37}NH(CH_2)_3NH_2$ | 20 | 70 | 90 | 95 |
| $C_{18}H_{37}NH(CH_2)_3NH(CH_2)_2COOH$ | 20 | 80 | 90 | 95 |

A second series of examples were carried out on bitumen emulsions, incorporating amino-acid hydrochlorides as follows:

$$C_{16}H_{33}NH_2Cl(CH_2)_2COOH$$

$$C_{18}H_{37}NH_2Cl—(CH_2)_3—NH_2Cl—(CH_2)_2—COOH$$

and $$C_{18}H_{37}NH_2Cl—(CH_2)_2—COOH$$

The amino-acid compounds were prepared from the corresponding aliphatic amines in the way indicated above for the preparation of hydrochlorides of Type I.

Example III

Basic emulsions of Tia Juana bitumen with an ASTM penetration at 25° C. of 180/220 were prepared under the following conditions: The emulsifying agent was dissolved in the aqueous phase in the presence of caustic soda in the proportions indicated in the table below. The bituminous phase was brought into contact with the aqueous phase thus treated and the whole was stirred with a turbomixer for 1 minute. The temperature of the two phases was about 80° C.

These tests gave the following results:

| Composition of the emulsion: | | | | |
|---|---|---|---|---|
| Bitumen content, percent (by weight with respect to the emulsion) | 60 | | | |
| $C_{18}H_{37}NH_2Cl—(CH_2)_2—COOH$ content, percent (by weight with respect to the bitumen) | 0.5 | | | |
| NaOH content, parts per thousand (by weight with respect to the bitumen) | 0.4 | 0.6 | 0.8 | 1 |
| Characteristics of the emulsion: | | | | |
| pH | 7.3 | 10 | 11.4 | 11.8 |
| Opacity | 0.5 | 2.1 | 1.5 | 1.5 |
| Engler viscosity at 20°C | 9.5 | 8.4 | 6 | 6.7 |
| Ease of demulsification by $CaCl_2$, percent | 69 | 94 | 78 | 59 |
| Separation after 7 days, percent | 2 | traces | traces | traces |
| Sedimentation after 7 days, percent | traces | traces | traces | traces |

This table shows that alkaline emulsions which are remarkably stable on storage can be obtained with the amino-acid hydrochloride in a basic medium.

Example IV

Acidic emulsions were prepared with the same bitumen as in Example III under the following conditions:

The emulsifying agent was dissolved in the aqueous phase in the presence of hydrochloric acid in the proportions indicated in the attached table. The bituminous phase was brought into contact with the aqueous phase thus treated and the whole was mixed with a turbomixer for one minute. The temperature of the two phases was about 80° C.

Table I allows the comparison of the characteristics of the acidic emulsions obtained by the use of the amino-acid salt and a polyamine and the results obtained for the coating of road materials.

In order to further show the advantages of emulsions prepared with amino-acids and their salts, additional experiments were conducted and the results of these experiments are compiled in Table I.

TABLE I

| Composition of the emulsion: | | | | | | | | | | | | |
|---|---|---|---|---|---|---|---|---|---|---|---|---|
| Bitumen content by weight (with respect to the emulsion, percent | 60 | | | | | | | | | | | |
| Content of emulsifying agent by weight with respect to the bitumen: | | | | | | | | | | | | |
| $C_{18}H_{37}NH_2Cl(CH_2)_3NH_2Cl(CH_2)_2COOH$, percent | 0.5 | | | | | | | | | | | |
| $C_{18}H_{37}NH—(CH_2)_3—NH_2$, percent | | | | | | | 0.5 | | | | | |
| Amount of HCl by weight with respect to the bitumen, parts per thousand | 3 | 4 | 5 | 6 | 7 | 8 | 3 | 4 | 5 | 6 | 7 | 8 |
| Characteristics of the emulsion: | | | | | | | | | | | | |
| pH | 0.4 | 0.3 | 0.1 | 0 | 0 | 0 | 0.3 | 0.2 | 0.1 | 0 | <0 | <0 |
| Opacity | 1.5 | 1.7 | 1.6 | 1.2 | 1 | 1 | 2.2 | 2.2 | 2.1 | 2.4 | 2.3 | 2.4 |
| Engler Viscosity at 20° C.,° E | 5.2 | 6.7 | 7.3 | 8 | 17 | 13 | 6.4 | 7 | 4 | 13 | 18 | 21 |
| Coating of 2-10 mm. silica: | | | | | | | | | | | | |
| Breaking time, sec | 90 | 60 | 150 | 60 | 30 | 60 | 180 | 170 | 150 | 70 | 90 | 40 |
| Stripping time, sec | 420 | >600 | 270 | 180 | 60 | 75 | >600 | >600 | >600 | 520 | 280 | >600 |
| Material covered after 10 minutes' mixing, percent | 80 | 100 | 95 | 95 | 95 | 95 | 95 | 100 | 100 | 95 | 95 | 95 |
| Coating of 3-8 mm. calcites: | | | | | | | | | | | | |
| Breaking time, sec | 10 | 10 | 10 | 10 | 10 | 10 | 30 | 15 | 10 | 10 | 10 | 10 |
| Stripping time, sec | >600 | >600 | >600 | >600 | >600 | >600 | 45 | 20 | 12 | 12 | 12 | 12 |
| Material covered after 10 minutes' mixing, percent | 95 | 100 | 100 | 100 | 100 | 100 | 0 | 0 | 0 | 0 | 0 | 0 |
| Separation after 8 days, percent | 4 | 4 | 8 | 3 | 5 | 3 | 2 | 2 | 8 | 2 | 5 | 10 |
| Sedimentation after 8 days, percent | 2 | 2 | T+ | 2 | 3 | 3 | 1 | 0 | 0 | 1 | T+ | T |

This table shows that the acidic emulsions obtained with the amino-acid hydrochloride enable the stripping of the coating from diverse materials, silica and limestones, to be avoided, while the conventional emulsions do not prevent the stripping of the coating from calcites, in particular.

*Example V*

Alkaline emulsions were prepared with a 180/220 Tia Juana bitumen under the conditions described in Example III. These tests gave the following results:

| Composition of the emulsion: | | |
|---|---|---|
| Bitumen content (by weight with respect to the emulsion) | 65 | 60 |
| Emulsifying agent (by weight with respect to the emulsion): | | |
| $C_{16}H_{33}NH_2Cl(CH_2)_2—COOH$ | 0.5 | |
| Oleic acid | | 0.5 |
| NaOH (by weight with respect to the emulsion), parts per thousand | 0.8 | 2 |
| Characteristics of the emulsion: | | |
| pH | 11.2 | 12.8 |
| Opacity | 2.3 | 1.4 |
| Separation after 7 days, percent | 1 | 10 |
| Sedimentation after 7 days, percent | traces | 0 |

*Example VI*

Acidic emulsions were prepared with a 180/220 Tia Juana bitumen under the conditions described in Example IV. These tests gave the following results:

| Composition of the emulsion: | | |
|---|---|---|
| Bitumen content, percent | 65 | |
| Content of emulsifying agent: | | |
| $C_{16}H_{33}NH_2Cl(CH_2)_2COOH$, percent | 0.5 | |
| $C_{16}H_{33}NH_2$, percent | | 0.5 |
| HCl, parts per thousand | 5 | 5 |
| Characteristics of the emulsion: | | |
| pH | 0.8 | 0.8 |
| Opacity | 2 | 2.6 |
| Separation after 7 days, percent | 1 | 1 |
| Sedimentation after 7 days, percent | traces | traces |

The above examples show that, with the amino-acids and their salts, emulsions identical with those obtained with the conventional emulsifying agents can be prepared, both in acidic and basic phase, although usually different emulsifying agents must be used according to whether it is an acidic or a basic phase.

What is claimed is:

1. A hydrocarbon binder composition consisting essentially of a bitumen binder, and from 0.1 to 10% by weight, based on the binder, of an adhesivity improving compound selected from the class of amino acids represented by the general formulas:

$$R.(NH.R')_nCOOH$$

and $$R.CH.NH_2.R'.COOH$$

wherein $n$ is an integer between 1 and 5, R is an alkyl radical having $C_{14}$ to $C_{18}$ carbon atoms and R' is an alkyl radical having $C_2$ to $C_3$ carbon atoms.

2. An improved coating emulsion comprising a major amount of a petroleum bitumen phase, a minor amount of an aqueous phase, and from 0.1 to 10% by weight, based on the bitumen phase, of the adhesivity improving compound described in claim 1.

3. The improved emulsion of claim 2 which contains additionally 0.15 to 1.5% by weight, based on the bitumen phase, of a mineral acid.

4. The improved emulsion of claim 2 which contains additionally 0.02 to 1% by weight, based on the bitumen phase, of an alkali selected from the class consisting of caustic soda and caustic potash.

5. The improved emulsion of claim 3 wherein said mineral acid is hydrochloric acid.

References Cited in the file of this patent
UNITED STATES PATENTS
2,035,122   Fulton et al. _____ Mar. 24, 1936
FOREIGN PATENTS
812,847   Great Britain _____ May 6, 1959
OTHER REFERENCES
"The Condensed Chemical Dictionary," 6th ed., Reinhold Publishing Corp., N.Y. 1956, page 58.
"The Condensed Chemical Dictionary," Reinhold Publishing Corp., New York, 1956, fifth edition, pages 524, 515 and 912.